United States Patent
Hudman et al.

(10) Patent No.: US 12,235,456 B2
(45) Date of Patent: Feb. 25, 2025

(54) FOLDED OPTICS FOR A HEAD MOUNTED DISPLAY

(71) Applicant: Valve Corporation, Bellevue, WA (US)

(72) Inventors: Joshua Hudman, Bellevue, WA (US); Doug VanderWel, Kent, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 18/603,690

(22) Filed: Mar. 13, 2024

(65) Prior Publication Data
US 2024/0310633 A1   Sep. 19, 2024

Related U.S. Application Data

(60) Provisional application No. 63/490,170, filed on Mar. 14, 2023.

(51) Int. Cl.
| | |
|---|---|
| *G02B 27/01* | (2006.01) |
| *G02B 5/30* | (2006.01) |
| *G02B 27/00* | (2006.01) |
| *G02B 27/09* | (2006.01) |

(52) U.S. Cl.
CPC ....... *G02B 27/0172* (2013.01); *G02B 5/3083* (2013.01); *G02B 27/0093* (2013.01); *G02B 27/0955* (2013.01); *G02B 2027/014* (2013.01)

(58) Field of Classification Search
CPC .............. G02B 27/0172; G02B 5/3083; G02B 27/0093; G02B 27/0955; G02B 27/014
See application file for complete search history.

(56) References Cited

U.S. PATENT DOCUMENTS

| | | |
|---|---|---|
| 10,890,776 B1 | 1/2021 | Gao et al. |
| 11,022,784 B1 * | 6/2021 | Wheelwright ....... G02B 27/286 |
| 11,054,622 B1 | 7/2021 | Gollier et al. |
| 11,372,239 B1 | 6/2022 | Sulai et al. |
| 2017/0068096 A1 * | 3/2017 | Ouderkirk ............ G02B 27/283 |

FOREIGN PATENT DOCUMENTS

CN    114740621 A    7/2022

OTHER PUBLICATIONS

PCT/US2024/019741, "International Search Report and Written Opinion", Jun. 7, 2024, 11 pages.

* cited by examiner

*Primary Examiner* — Robert J Michaud
(74) *Attorney, Agent, or Firm* — Kilpatrick Townsend & Stockton LLP

(57) ABSTRACT

A lens system for a head-mounted display includes a first lens, a second lens, a first waveplate, a partial reflector, and a second waveplate. The partial reflector is between the first lens and the second lens. The first waveplate is between the first lens and the partial reflector. The second waveplate is between the second lens and the partial reflector. Reflective polarizers are on curved surfaces of the first lens and the second lens.

20 Claims, 11 Drawing Sheets

FOLDED OPTICS FOR A HEAD MOUNTED DISPLAY

CROSS-REFERENCE TO RELATED APPLICATIONS

This application claims the benefit of U.S. Provisional Patent Application No. 63/490,170, filed Mar. 14, 2023, the entire contents of which are hereby incorporated by reference for all purposes in its entirety.

BACKGROUND

The following disclosure generally relates to head-mounted displays. A head-mounted display (HMD) is an electronic device or system worn on a user's head and, when worn, secures at least one electronic display within a viewable field of at least one of the user's eyes, regardless of a position or orientation of the user's head. An HMD used to implement virtual reality (VR) typically envelop a wearer's eyes completely and substitute a "virtual" reality for an actual view (or actual reality) in front of the user. An HMD for augmented reality (AR) can provide a semi-transparent or transparent overlay of one or more screens in front of a wearer's eyes such that an actual view is augmented with additional information. In some AR devices, the "display" component of an HMD can be transparent or at a periphery of the user's field of view so that it does not completely block the user from being able to see their external environment. In some AR devices, a display overlays digital content on a video feed from a camera acquiring images of a real scene. Mixed Reality (MR) is an interaction between a digital and the physical world. Extended Reality (ER) can be used to refer to VR, AR, and/or MR.

BRIEF SUMMARY

A lens system for a head-mounted display is used to focus light from a display to an eye box for a user. In some configurations, a lens system for a head-mounted display includes a first lens, a second lens, a first waveplate, a partial reflector, and a second waveplate. The partial reflector is between the first lens and the second lens. The first waveplate is between the first lens and the partial reflector. The second waveplate is between the second lens and the partial reflector. Reflective polarizers can be on curved surfaces of the first lens and the second lens. The second lens can have the same shape as the first lens.

In some configuration, an apparatus for folded optics in a head-mounted display comprises a display and a lens system. The lens system is arranged to focus light from the display to a user's eye. The lens system comprises a first lens having a first surface and a second surface, the second surface is opposite the first surface, the first surface is curved, the first lens has a first thickness profile, and/or the first thickness profile is measured between the first surface and the second surface of the first lens; a second lens, wherein the second lens has a third surface and a fourth surface, the fourth surface is opposite the third surface, the fourth surface is curved, the second lens has a second thickness profile, the second thickness profile is measured between the third surface and the fourth surface, the second thickness profile is the same as the first thickness profile, the second lens is symmetrically arranged in relation to the first lens so that the third surface is closer to the second surface than the first surface, and/or the second surface is closer to the third surface than the fourth surface; a partial reflector between the first lens and the second lens; a first waveplate between the partial reflector and the first lens; a second waveplate between the partial reflector and the second lens; a first reflective polarizer, arranged so that the first lens is between the first waveplate and the first reflective polarizer; and/or a second reflective polarizer, arranged so that the second lens is between the second waveplate and the second reflective polarizer.

In some embodiments, the first thickness profile corresponds to a plano-convex lens, the first reflective polarizer is on the first surface; the second reflective polarizer is on the fourth surface; the first waveplate and the second waveplate are quarter-wave plates; a fast axis of the first waveplate and a fast axis of the second waveplate are oriented in similar directions; the second surface of the first lens and the third surface of the second lens are flat; the first waveplate is bonded to the first lens; the second waveplate is bonded to the second lens; the first waveplate is bonded to the partial reflector; the second waveplate is bonded with the partial reflector; the first waveplate, the second waveplate, and the partial reflector are flat; and/or the apparatus is part of a virtual-reality headset.

In some configurations, a method for using folded optics in a head-mounted display comprises transmitting light from a display through a first reflective polarizer and a first lens, wherein the first lens has a first surface and a second surface, the second surface is opposite the first surface, the first surface is curved, the first lens has a first thickness profile, and/or the first thickness profile is measured between the first surface and the second surface of the first lens; transmitting light from the first lens through a first waveplate and to a partial reflector, wherein the first waveplate is between the partial reflector and the first lens, and/or the first lens is between the first waveplate and the first reflective polarizer; transmitting light from the partial reflector through a second waveplate and to a second lens, wherein the partial reflector is between the first lens and the second lens, the second waveplate is between the partial reflector and the second lens, the second lens has a third surface and a fourth surface, the fourth surface is opposite the third surface, the fourth surface is curved, the second lens has a second thickness profile, the second thickness profile is measured between the third surface and the fourth surface, the second thickness profile is the same as the first thickness profile, the second lens is symmetrically arranged in relation to the first lens so that the third surface is closer to the second surface than the first surface, and/or the second surface is closer to the third surface than the fourth surface; transmitting light through the second lens and to a second reflective polarizer, wherein the second lens is between the second waveplate and the second reflective polarizer.

In some embodiments, the method further comprises reflecting light from the partial reflector to the first reflective polarizer, and reflecting light by the first reflective polarizer, before transmitting light from the partial reflector through the second waveplate; reflecting light by the second reflective polarizer to the partial reflector; and/or reflecting light from the partial reflector through the second lens and through the second reflective polarizer.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
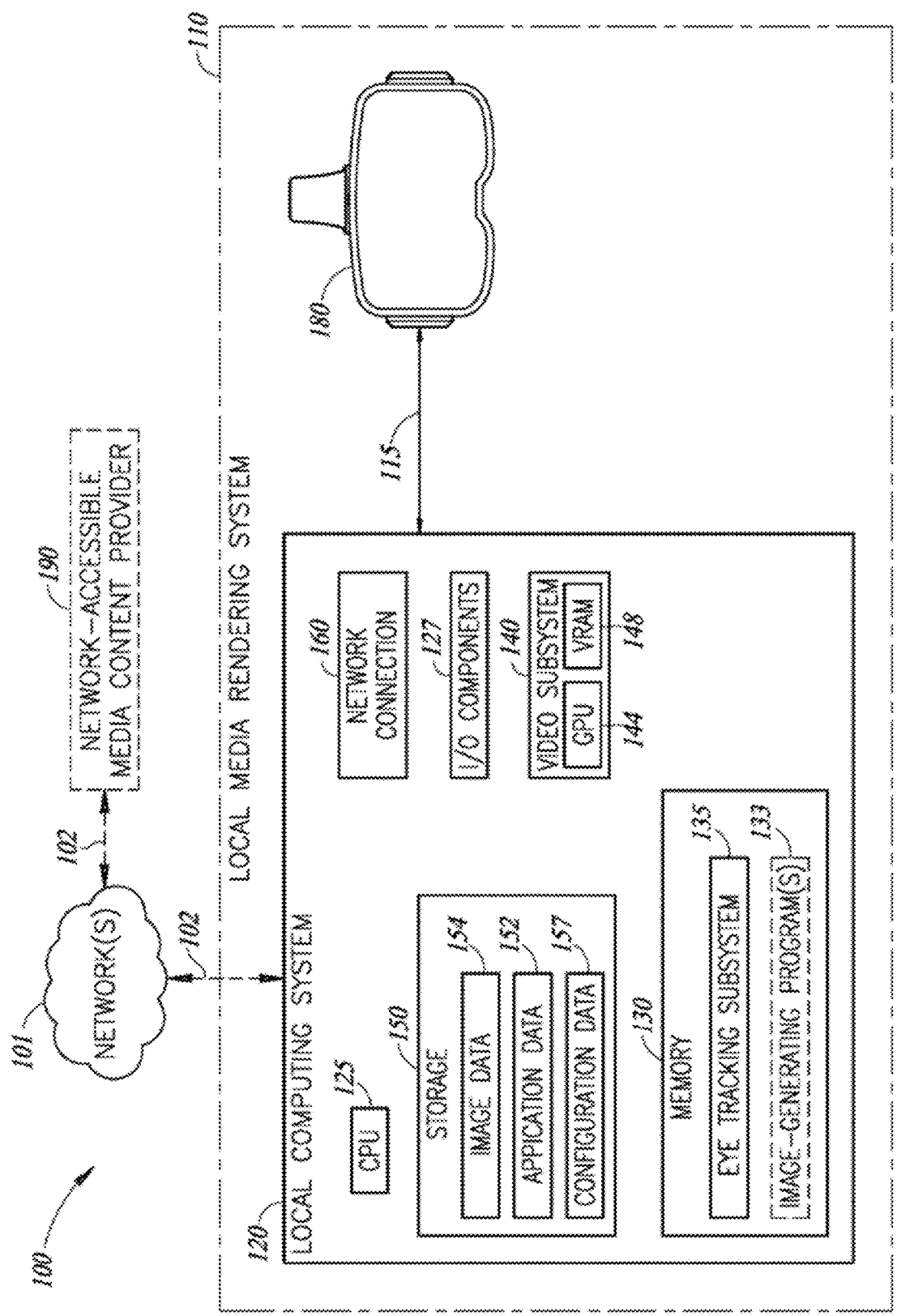
FIG. 1 is a schematic diagram of an embodiment of a networked environment of a head-mounted display (HMD).

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Folded optics can be used to fold an optical path to reduce a form factor of a lens system. An example of folded optics in a head-mounted display is a pancake lens. Some pancake lenses have an efficiency limit of 25% because light is twice incident on a partial mirror. In some embodiments, reflective polarizers are used in a lens system to recapture some light reflected by the partial mirror. The theoretical loss for a lens system (e.g., using folded optics and reflective polarizers) is 50% in some embodiments.

For illustrative purposes, some embodiments are described below in which specific types of information are acquired and used in specific types of ways for specific types of structures and by using specific types of devices. However, it will be understood that such described techniques may be used in other manners in other embodiments, and that the present disclosure is thus not limited to the exemplary details provided. As a non-exclusive example, some embodiments include the use of images that are video frames. While an example may refer to a "video frame" for convenience, it will be appreciated that the techniques described with the example may be employed with respect to one or more images of various types, including non-exclusive examples of multiple video frames in succession (e.g., at 30, 60, 90, 180 or some other quantity of frames per second), other video content, photographs, computer-generated graphical content, other articles of visual media, or some combination thereof. Additionally, various details are provided in the drawings and text for exemplary purposes and are not intended to limit the scope of the present disclosure.

Figure 2:
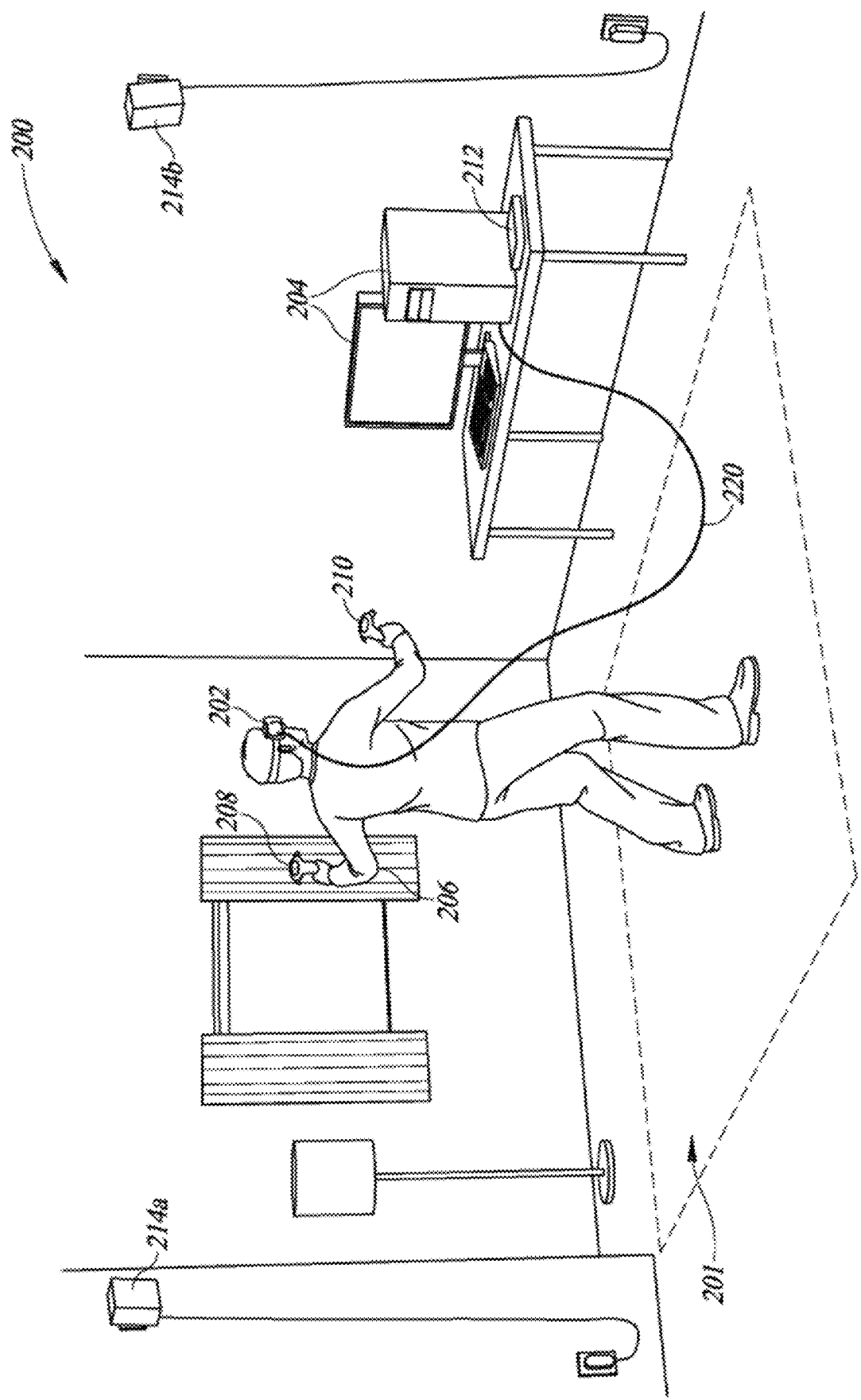
FIG. 2 is a diagram illustrating an embodiment of an environment for using an HMD.

FIG. 1 is a schematic diagram of an embodiment of a networked environment 100. The networked environment 100 includes a local media rendering (LMR) system 110 (e.g., a gaming system), which includes a local computing system 120 and display device 180 (e.g., an HMD device with two display panels). In FIG. 1, the local computing system 120 is communicatively connected to display device 180 via transmission link 115 (which may be wired or tethered, such as via one or more cables as illustrated in FIG. 2 (cable 220), or instead may be wireless). In some embodiments, the local computing system 120 may provide encoded image data for display to a panel display device (e.g., a TV, console or monitor) via a wired or wireless link, whether in addition to or instead of the HMD device 180, and the display devices each includes one or more addressable pixel arrays. In some embodiments, the local computing system 120 may include a general purpose computing system; a gaming console; a video stream processing device; a mobile computing device (e.g., a cellular telephone, PDA, or other mobile device); a VR or AR processing device; or other computing system.

A pixel is the smallest addressable image element of a display that may be activated to provide a color value. In some cases, a pixel includes individual respective sub-elements (in some cases as separate "sub-pixels") for separately producing red, green, and blue light for perception by a human viewer, with separate color channels used to encode pixel values for the sub-pixels of different colors. A pixel value refers to a data value corresponding to respective levels of stimulation for one or more of respective RGB elements of a single pixel.

In FIG. 1, the local computing system 120 has components that include one or more hardware processors (e.g., centralized processing units, or "CPUs") 125, memory 130, various I/O ("input/output") hardware components 127 (e.g., a keyboard, a mouse, one or more gaming controllers, speakers, microphone, IR transmitter and/or receiver, etc.), a video subsystem 140 that includes one or more specialized hardware processors (e.g., graphics processing units, or "GPUs") 144 and video memory (VRAM) 148, computer-readable storage 150, and a network connection 160. An embodiment of an eye tracking subsystem 135 executes in memory 130 in order to perform one or more processes, such as by using the CPU(s) 125 and/or GPU(s) 144 to perform automated operations. The memory 130 may optionally further execute one or more other programs 133 (e.g., to generate video or other images to be displayed, such as a game program). As part of the automated operations, the eye tracking subsystem 135 and/or programs 133 executing in memory 130 may store or retrieve various types of data, including in the example database data structures of storage 150, in this example, the data used may include various types of image data information in database ("DB") 154, various types of application data in DB 152, various types of configuration data in DB 157, and may include additional information, such as system data or other information.

The LMR system 110 is communicatively connected via one or more computer networks 101 and network links 102 to an exemplary network-accessible media content provider 190 that may further provide content to the LMR system 110 for display, whether in addition to or instead of the image-generating programs 133. The media content provider 190 may include one or more computing systems (not shown) that may each have components similar to those of local computing system 120, including one or more hardware processors, I/O components, local storage devices and memory, although some details are not illustrated for the network-accessible media content provider for the sake of brevity.

It will be appreciated that, while the display device 180 is depicted as being distinct and separate from the local computing system 120 in FIG. 1, in some embodiments, some or all components of the local media rendering system 110 may be integrated or housed within a single device, such as a mobile gaming device, portable VR entertainment system, HMD device, etc. In some embodiments, transmission link 115 may, for example, include one or more system buses and/or video bus architectures.

As one example involving operations performed locally by the local media rendering system 120, assume that the local computing system is a gaming computing system, such that application data 152 includes one or more gaming applications executed via CPU 125 using memory 130, and that various video frame display data is generated and/or processed by the image-generating programs 133, such as in conjunction with GPU 144 of the video subsystem 140. In order to provide a quality gaming experience, a high volume of video frame data (corresponding to high image resolution for each video frame, as well as a high "frame rate" of approximately 60-180 of such video frames per second) is generated by the local computing system 120 and provided via the wired or wireless transmission link 115 to the display device 180.

It will also be appreciated that computing system 120 and display device 180 are merely illustrative and are not intended to limit the scope of the present disclosure. The computing system 120 may instead include multiple interacting computing systems or devices, and may be connected to other devices that are not illustrated, including through one or more networks such as the Internet, via the Web, or via private networks (e.g., mobile communication networks, etc.). More generally, a computing system or other computing node may include any combination of hardware or software that may interact and perform the described types of functionality, including, without limitation, desktop or other computers, game systems, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. The display device 180 may similarly include one or more devices with one or more display panels of various types and forms, and optionally include various other hardware and/or software components.

In addition, the functionality provided by the eye tracking subsystem 135 may, in some embodiments, be distributed in one or more components, and in some embodiments some of the functionality of the eye tracking subsystem 135 may not be provided and/or other additional functionality may be available. It will also be appreciated that, while various items are illustrated as being stored in memory or on storage while being used, these items or portions of them may be transferred between memory and other storage devices for purposes of memory management or data integrity. Thus, in some embodiments, techniques may be performed by hardware that include one or more processors or other configured hardware circuitry or memory or storage, such as when configured by one or more software programs (e.g., by the eye tracking subsystem 135 or it components) and/or data structures (e.g., by execution of software instructions of the one or more software programs and/or by storage of such software instructions and/or data structures). Some or all of the components, systems, and/or data structures may be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in some embodiments.

FIG. 2 illustrates an embodiment of an environment 200 used with an example HMD device 202 that is coupled to a video rendering computing system 204 via a tethered connection 220 (or a wireless connection in some embodiments) to provide a virtual reality display to a human user 206. The user wears the HMD device 202 and receives displayed information via the HMD device from the computing system 204 of a simulated environment different from the actual physical environment, with the computing system acting as an image rendering system that supplies images of the simulated environment to the HMD device for display to the user, such as images generated by a game program and/or other software program executing on the computing system. The user is further able to move around within a tracked volume 201 of the actual physical environment 200 in this example, and may further have one or more I/O ("input/output") devices to allow the user to further interact with the simulated environment, which in this example includes hand-held controllers 208 and 210.

In the illustrated example, the environment 200 may include one or more base stations 214 (two shown, labeled base stations 214-*a* and 214-*b*) that may facilitate tracking of the HMD device 202 or the controllers 208 and 210. As the user moves location or changes orientation of the HMD device 202, the position of the HMD device is tracked, such as to allow a corresponding portion of the simulated environment to be displayed to the user on the HMD device, and the controllers 208 and 210 may further employ similar techniques to use in tracking the positions of the controllers (and to optionally use that information to assist in determining or verifying the position of the HMD device). After the tracked position of the HMD device 202 is known, corresponding information is transmitted to the computing system 204 via the tether 220 or wirelessly, which uses the tracked position information to generate one or more next images of the simulated environment to display to the user.

There are numerous methods of positional tracking that may be used in the various implementations of the present disclosure, including, but not limited to, acoustic tracking, inertial tracking, magnetic tracking, optical tracking, combinations thereof, etc.

In some implementations, the HMD device 202 includes one or more optical receivers or sensors that may be used to implement tracking functionality or other aspects of the present disclosure. For example, the base stations 214 may each sweep an optical signal across the tracked volume 201. Depending on the requirements of each particular implementation, each base station 214 may generate more than one optical signal. For example, while a single base station 214 can be sufficient for six-degree-of-freedom tracking, multiple base stations (e.g., base stations 214 a, 214 b) may be used in some embodiments to provide robust room-scale tracking for HMD devices and/or peripherals. In this example, optical receivers are incorporated into the HMD device 202 and or other tracked objects, such as the controllers 208 and 210. In some embodiments, optical receivers may be paired with an accelerometer and gyroscope Inertial Measurement Unit ("IMU") on each tracked device to support low-latency sensor fusion.

In some implementations, each base station 214 includes two rotors that sweep a linear beam across the tracked volume 201 on orthogonal axes. At the start of each sweep cycle, the base station 214 may emit an omni-directional light pulse (referred to as a "sync signal") that is visible to sensors on the tracked objects. Thus, each sensor computes a unique angular location in the swept volume by timing the duration between the sync signal and the beam signal. Sensor distance and orientation may be solved using multiple sensors affixed to a single rigid body.

The one or more sensors positioned on the tracked objects (e.g., HMD device 202, controllers 208 and 210) may comprise an optoelectronic device capable of detecting the modulated light from the rotor. For visible or near-infrared (NIR) light, silicon photodiodes and suitable amplifier/detector circuitry may be used. Because the environment 200 may contain static and time-varying signals (optical noise) with similar wavelengths to the signals of the base stations 214 signals, in some implementations the base station light may be modulated in such a way as to make it easy to differentiate from any interfering signals, and/or to filter the sensor from any wavelength of radiation other than that of base station signals.

Inside-out tracking is also a type positional tracking that may be used to track the position of the HMD device 202 and/or other objects (e.g., controllers 208 and 210, tablet computers, smartphones). Inside-out tracking differs from outside-in tracking by the location of the cameras or other sensors used to determine the HMD's position. For inside-out tracking, the camera or sensors are located on the HMD, or object being tracked, while in outside-out tracking the camera or sensors are placed in a stationary location in the environment.

An HMD that utilizes inside-out tracking utilizes one or more cameras to "look out" to determine how its position changes in relation to the environment. When the HMD moves, the sensors readjust their place in the room and the virtual environment responds accordingly in real-time. This type of positional tracking can be achieved with or without markers placed in the environment. The cameras that are placed on the HMD observe features of the surrounding environment. When using markers, the markers are designed to be easily detected by the tracking system and placed in a specific area. With "markerless" inside-out tracking, the HMD system uses distinctive characteristics (e.g., natural features) that originally exist in the environment to determine position and orientation. The HMD system's algorithms identify specific images or shapes and use them to calculate the device's position in space. Data from accelerometers and gyroscopes can also be used to increase the precision of positional tracking.

Figure 3:
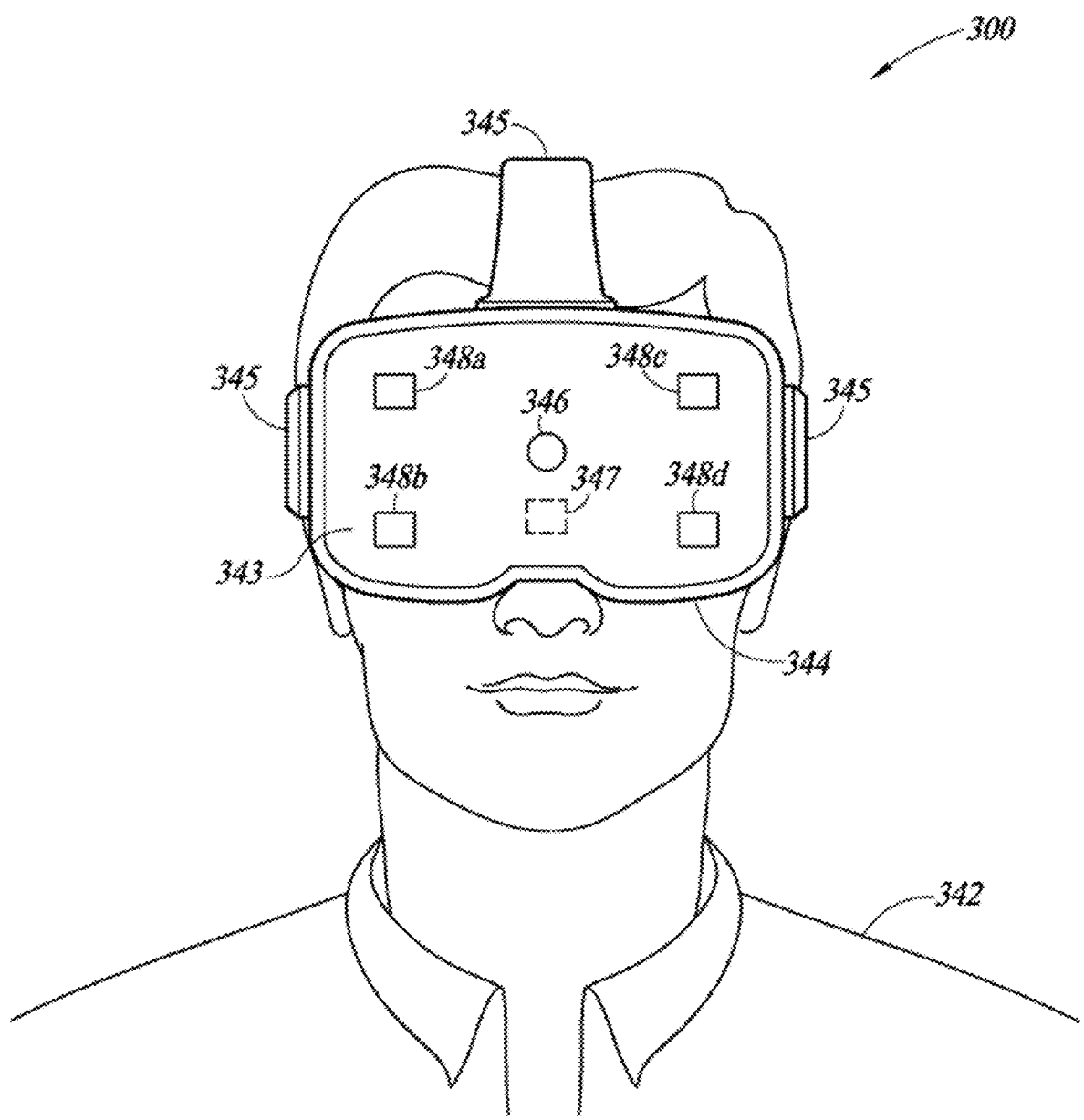
FIG. 3 is a front pictorial diagram of an embodiment of an HMD having binocular display subsystems.

FIG. 3 shows information 300 illustrating a front view of an example HMD device 344 when worn on the head of a user 342. The HMD device 344 includes a front-facing structure 343 that supports a front-facing or forward camera 346 and a plurality of sensors 348 a-348 d(collectively 348) of one or more types. As one example, some or all of the sensors 348 may assist in determining the location and/or orientation of the device 344 in space, such as light sensors to detect and use light information emitted from one or more external devices (not shown, e.g., base stations 214 of FIG. 2). As shown, the forward camera 346 and the sensors 348 are directed forward toward an actual scene or environment (not shown) in which the user 342 operates the HMD device 344. The actual physical environment may include, for example, one or more objects (e.g., walls, ceilings, furniture, stairs, cars, trees, tracking markers, or any other types of objects). The particular number of sensors 348 may be fewer or more than the number of sensors depicted. The HMD device 344 may further include one or more additional components that are not attached to the front-facing structure (e.g., are internal to the HMD device), such as an IMU (inertial measurement unit) 347 electronic device that measures and reports the HMD device's 344 specific force, angular rate, and/or the magnetic field surrounding the HMD device (e.g., using a combination of accelerometers and gyroscopes, and optionally, magnetometers). The HMD device may further include additional components that are not shown, including one or more display panels and optical lens systems that are oriented toward eyes (not shown) of the user and that optionally have one or more attached internal motors to change the alignment or other positioning of one or more of the optical lens systems and/or display panels within the HMD device, as discussed in greater detail below with respect to FIG. 4.

The illustrated example of the HMD device 344 is supported on the head of user 342 based at least in part on one or more straps 345 that are attached to the housing of the HMD device 344 and that extend wholly or partially around the user's head. While not illustrated here, the HMD device 344 may further have one or more external motors, such as attached to one or more of the straps 345, and automated corrective actions may include using such motors to adjust such straps in order to modify the alignment or other positioning of the HMD device on the head of the user. It will be appreciated that HMD devices may include other support structures that are not illustrated here (e.g., a nose piece, chin strap, etc.), whether in addition to or instead of the illustrated straps, and that some embodiments may include motors attached one or more such other support structures to similarly adjust their shape and/or locations to modify the alignment or other positioning of the HMD device on the head of the user. Other display devices that are not affixed to the head of a user may similarly be attached to or part of one or structures that affect the positioning of the display device, and may include motors or other mechanical actuators some embodiments to similarly modify their shape and/or locations to modify the alignment or other positioning of the display device relative to one or more pupils of one or more users of the display device.

Figure 4:
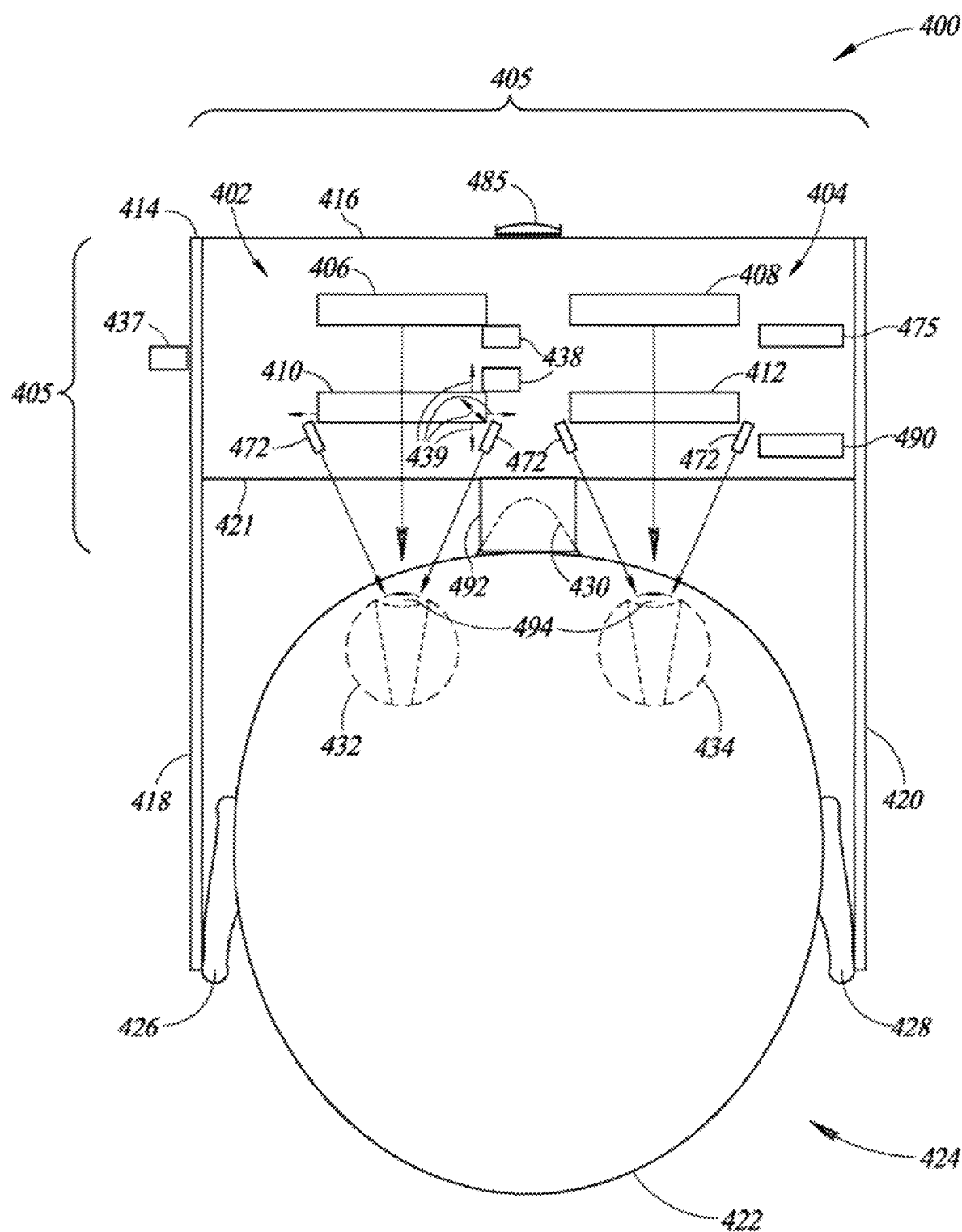
FIG. 4 illustrates a top plan view of an embodiment of an HMD having binocular display subsystems and various sensors.

FIG. 4 illustrates a simplified top plan view 400 of an embodiment of an HMD device 405 that includes a pair of near-to-eye display systems 402 and 404. The HMD device 405 may, for example, be the same or similar HMD devices illustrated in FIGS. 1-3 or a different HMD device, and the HMD devices discussed herein may further be used in the examples discussed further below. The near-to-eye display systems 402 and 404 of FIG. 4 include display panels 406 and 408, respectively (e.g., OLED micro-displays), and respective optical lens systems 410 and 412 that each have one or more optical lenses. The display systems 402 and 404 may be mounted to or otherwise positioned within a housing (or frame) 414, which includes a front-facing portion 416 (e.g., the same or similar to the front-facing surface 343 of FIG. 3), a left temple 418, right temple 420 and interior surface 421 that touches or is proximate to a face of a wearer user 424 when the HMD device is worn by the user. The two display systems 402 and 404 may be secured to the housing 414 in an eye glasses arrangement which can be worn on the head 422 of a wearer user 424, with the left temple 418 and right temple 420 resting over the user's cars 426 and 428, respectively, while a nose assembly 492 may rest over the user's nose 430. In the example of FIG. 4, the HMD device 405 may be supported on the head of the user in part or in whole by the nose display and/or the right and left over-ear temples, although straps (not shown) or other structures may be used in some embodiments to secure the HMD device to the head of the user, such as the embodiments shown in FIGS. 2 and 3. The housing 414 may be shaped and sized to position each of the two optical lens systems 410 and 412 in front of one of the user's eyes 432 and 434, respectively, such that a target location of each pupil 494 is centered vertically and horizontally in front of the respective optical lens systems and/or display panels. Although the housing 414 is shown in a simplified manner similar to eyeglasses for explanatory purposes, it should be appreciated that in practice more sophisticated structures (e.g., goggles, integrated headband, helmet, straps, etc.) may be used to support and position the display systems 402 and 404 on the head 422 of user 424.

The HMD device 405 of FIG. 4 is arranged to present a virtual reality display to the user, such as via corresponding video presented at a display rate such as 30 or 60 or 90 frames (or images) per second. In some embodiments, the HMD device may present an augmented reality display to the user. Each of the displays 406 and 408 of FIG. 4 may generate light which is transmitted through and focused by the respective optical lens systems 410 and 412 onto the eyes 432 and 434, respectively, of the user 424. The pupil 494 aperture of each eye, through which light passes into the eye, will generally have a pupil size ranging from 2 mm (millimeters) in diameter in very bright conditions to as much as 8 mm in dark conditions, while the larger iris in which the pupil is contained may have a size of approximately 12 mm-the pupil (and enclosing iris) may further move within the visible portion of the eye under open eyelids by several millimeters in the horizontal and/or vertical directions, which will also move the pupil to different depths from the optical lens or other physical elements of the display for different horizontal and vertical positions as the eyeball swivels around its center (resulting in a three dimensional volume in which the pupil can move). The light entering the user's pupils is seen by the user 424 as images and/or video. In some implementations, the distance between each of the optical lens systems 410 and 412 and the user's eyes 432 and 434 may be relatively short (e.g., less than 30 mm, less than 20 mm), which advantageously causes the HMD device to appear lighter to the user since the weight of the optical lens systems and the display systems are relatively close to the user's face, and also may provide the user with a greater field of view. Some embodiments of an HMD device may include various additional internal and/or external sensors.

In FIG. 4, the HMD device 405 includes hardware sensors and additional components, such as to include one or more accelerometers and/or gyroscopes 490 (e.g., as part of one or more IMU units). Values from the accelerometer(s) and/or gyroscopes may be used to locally determine an orientation of the HMD device. In addition, the HMD device 405 may include one or more front-facing cameras, such as camera(s) 485 on the exterior of the front portion 416, and whose information may be used as part of operations of the HMD device, such as for providing AR functionality or positioning functionality. Furthermore, the HMD device 405 may further include other components 475 (e.g., electronic circuits to control display of images on the display panels 406 and 408, internal storage, one or more batteries, position tracking devices to interact with external base stations, etc.). Some embodiments may not include one or more of the components 475, 485 and/or 490. Some embodiments of an HMD device may include various additional internal and/or external sensors, such as to track various other types of movements and position of the user's body, eyes, controllers, etc.

The HMD device 405 further includes hardware sensors and additional components that may be used for determining user pupil or gaze direction, which may be provided to one or more components associated with the HMD device for use. The hardware sensors include one or more eye tracking assemblies 472 of an eye tracking subsystem that are mounted on or near the display panels 406 and 408 and/or located on the interior surface 421 near the optical lens systems 410 and 412 for use in acquiring information regarding the actual locations of the user's pupils 494, such as separately for each pupil in this example.

Each of the eye tracking assemblies 472 may include one or more light sources (e.g., IR LEDs) and one or more light detectors (e.g., silicon photodiodes). Further, although only four total eye tracking assemblies 472 are shown in FIG. 4 for clarity, it should be appreciated that in practice a different number of eye tracking assemblies may be provided. In some embodiments, a total of eight eye tracking assemblies 472 are provided, four eye tracking assemblies for each eye of the user 424. Further, in some embodiments, each eye tracking assembly includes a light source directed at one of the user's 424 eyes 432 and 434, a light detector positioned to receive light reflected by the respective eye of the user, and a polarizer positioned and configured to prevent light that is reflected via specular reflection from being imparted on the light detector.

Information from the eye tracking assemblies 472 may be used to determine and track the user's gaze direction during use of the HMD device 405. Furthermore, in some embodiments, the HMD device 405 may include one or more internal motors 438 (or other movement mechanisms) that may be used to move 439 the alignment and/or other positioning (e.g., in the vertical, horizontal left-and-right and/or horizontal front-and-back directions) of one or more of the optical lens systems 410 and 412 and/or display panels 406 and 408 within the housing of the HMD device 405, such as to personalize or otherwise adjust the target pupil location of one or both of the near-to-eye display systems 402 and 404 to correspond to the actual locations of one or both of the pupils 494. Such motors 438 may be controlled by, for example, user manipulation of one or more controls 437 on the housing 414 and/or via user manipulation of one or more associated separate I/O controllers (not shown). In some embodiments the HMD device 405 may control the alignment and/or other positioning of the optical lens systems 410 and 412 and/or display panels 406 and 408 without such motors 438, such as by use of adjustable positioning mechanisms (e.g., screws, sliders, ratchets, etc.) that are manually changed by the user via use of the controls 437. While the motors 438 are illustrated in FIG. 4 for only one of the near-to-eye display systems, each near-to-eye display system may have its own one or more motors, and, in some embodiments, one or more motors may be used to control (e.g., independently) each of multiple near-to-eye display systems.

In some embodiments, other types of display systems may be used, including with a single optical lens and display device, or with multiple such optical lenses and display devices. Non-exclusive examples of other such devices include cameras, telescopes, microscopes, binoculars, spotting scopes, surveying scopes, etc. Additionally, a wide variety of display panels or other display devices that emit light to form images may be used, which one or more users view through one or more optical lens. In some embodiments, a user may view one or more images through one or more optical lenes that are produced in a manner other than via a display panel, such as on a surface that reflects light from another light source in part or in whole.

Figure 5:
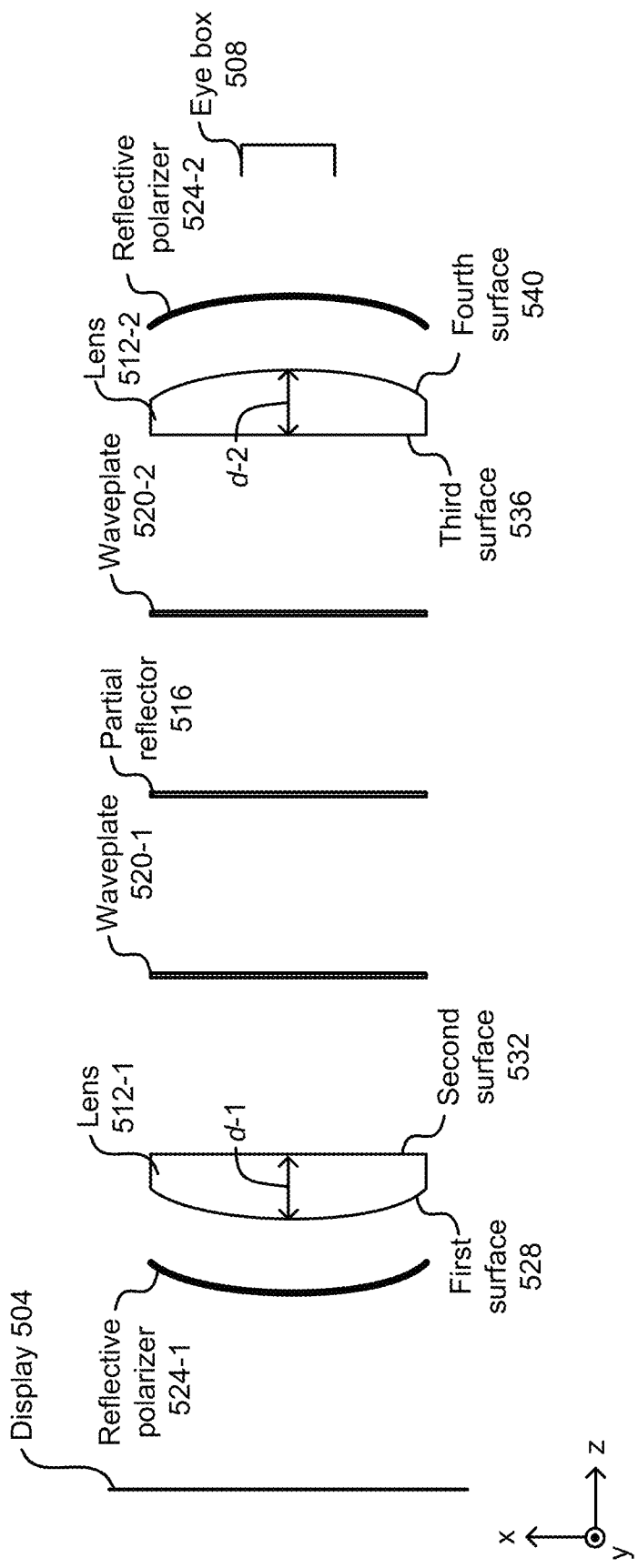
FIG. 5 is an exploded diagram of an embodiment of a lens system that uses folded optics.

FIG. 5 is an exploded diagram of an embodiment of a lens system that uses folded optics for a head-mounted display. The lens system is arranged to focus light from a display 504 (e.g., projector) to a user's eye (e.g., eye box 508). The lens system comprises a first lens 512-1, a second lens 512-2, a partial reflector 516, a first waveplate 520-1, a second waveplate 520-2, a first reflective polarizer 524-1, and a second reflective polarizer 524-2.

The first lens 512-1 has a first surface 528 and a second surface 532. The second surface 532 is opposite the first surface 528. The first surface 528 is curved (e.g., to focus light from the display 504 to the eye box 508). The first lens 512-1 has a first thickness profile. The first thickness profile is measured between the first surface 528 and the second surface 532 of the first lens 512-1. For example, the thickness profile is a thickness d of the lens 512, measured in the z dimension (e.g., d-1 for the first lens 512-1 and d-2 for the second lens 512-2), at a given position (e.g., x, y) of the lens 512.

The second lens 512-2 has a third surface 536 and a fourth surface 540. The fourth surface 540 is opposite the third surface 536. The fourth surface 540 is curved (e.g., to focus light from the display 504 to the eye box 508). The second lens 512-2 has a second thickness profile. The second thickness profile is measured between the third surface 536 and the fourth surface 540 (e.g., in the z direction). The second thickness profile is the same as the first thickness profile (e.g., d-1=d-2 for each (x, y) of the lens 512). For example, the first thickness profile (and the second thickness profile) is for a plano-convex lens. The second lens 512-2 is symmetrically arranged in relation to the first lens 512-1 so that the third surface 536 is closer to the second surface 532 than the first surface 528, and the second surface 532 is closer to the third surface 536 than the fourth surface 540. Having the second lens 512-2 be the same (e.g., same profile) as the first lens 512-1 enables the lens system to have fewer number of unique parts and/or can simplify production.

The partial reflector 516 is between the first lens 512-1 and the second lens 512-2. In some embodiments, the partial reflector 516 is a 50/50 mirror. The first waveplate 520-1 is between the partial reflector 516 and the first lens 512-1. The second waveplate 520-2 is between the partial reflector 516 and the second lens 512-2. A waveplate is an optical retarder. An optical retarder is an optical element that introduces a relative phase shift between constituent orthogonal components of a wave. A quarter-wave plate (QWP) introduces a π/2 phase shift, if properly clocked with incoming light (e.g., at 45 degrees). A half-wave plate introduces a x phase shift.

The first reflective polarizer 524-1 is arranged so that the first lens 512-1 is between the first waveplate 520-1 and the first reflective polarizer 524-1. For example, the first reflective polarizer 524-1 is on the first surface 528 of the first lens 512-1 or on a substrate separate from the first lens 512-1. The second reflective polarizer 524-2 is arranged so that the second lens 512-2 is between the second waveplate 520-2 and the second reflective polarizer 524-2. For example, the second reflective polarizer 524-2 is on the fourth surface 540 of the second lens 512-2 or on a substrate separate from the second lens 512-2. In some embodiments, the first waveplate 520-1 and the second waveplate 520-2 are quarter-wave plates.

Figure 6:
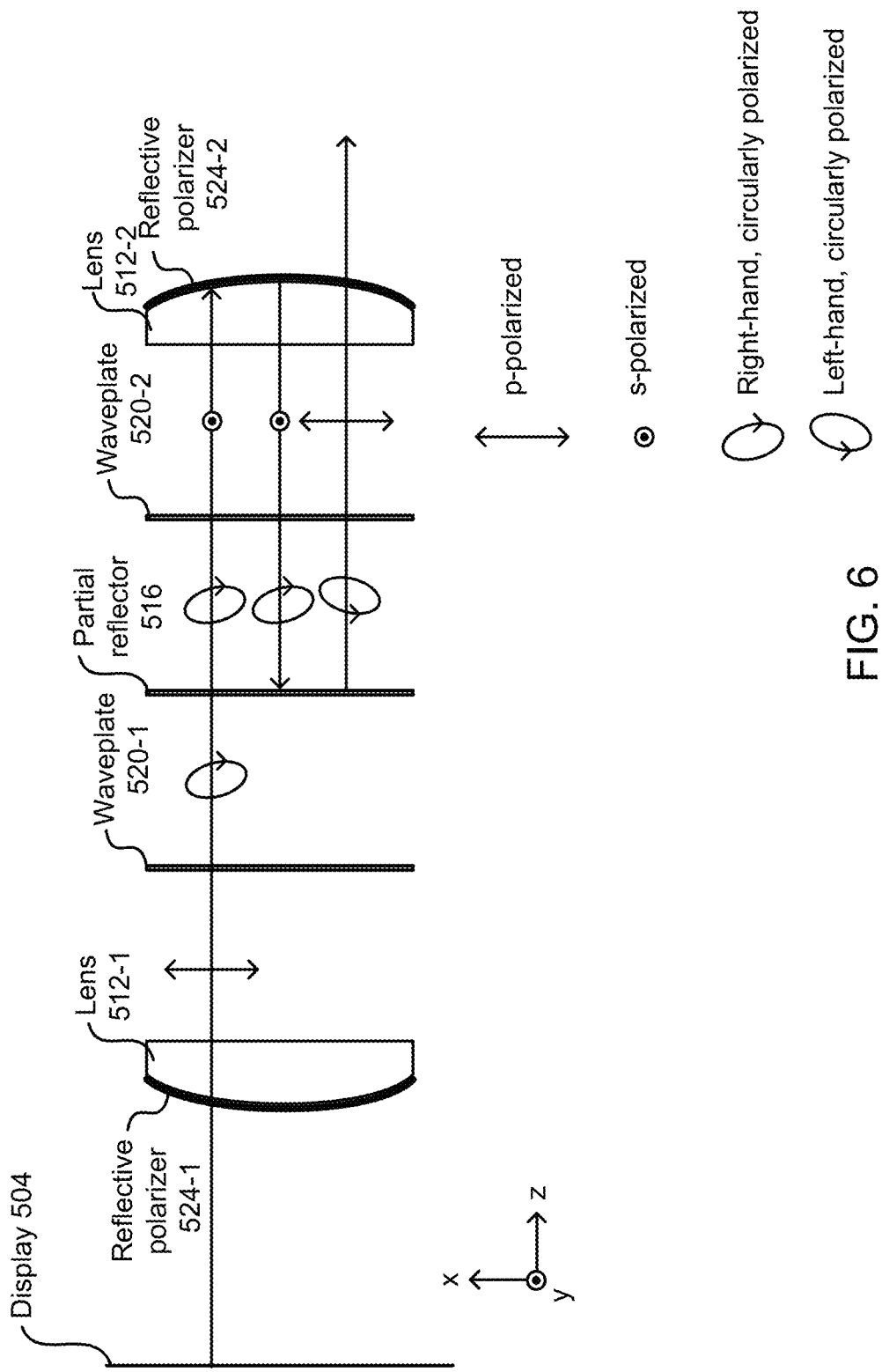
FIG. 6 depicts an embodiment of a first path of light in the lens system.

FIG. 6 depicts a first path of light in an embodiment of a lens system. Light from the display 504 passes through the first reflective polarizer 524-1, the first lens 512-1, the first waveplate 520-1, the partial reflector 516, the second waveplate 520-2, the second lens 512-2, and is reflected by the second reflective polarizer 524-2. After reflecting from the second reflective polarizer 524-2, light travels back through the second waveplate 520-2 and is reflected by the partial reflector 516 (e.g., with some loss). After reflecting from the partial reflector 516, light passes through the second waveplate 520-2 and through the second reflective polarizer 524-2 to an eye of the user.

In some embodiments, the first reflective polarizer 524-1 is arranged to transmit p-polarized light (light polarized in the x direction) and reflect s-polarized light (light polarized in the y direction). The waveplates 520 are quarter-wave plates and oriented at 45 degrees with respect to the x axis. The second reflective polarizer 524-2 is arranged to transmit p-polarized light and reflect s-polarized light (e.g., clocked at the same angle as the first reflective polarizer 524-1). The partial reflector 516 is a 50/50 mirror. Variations from the embodiment(s) shown can be made. For example, the reflective polarizers 524 could be arranged (e.g., oriented) to pass s-polarized light, and/or waveplates 520 could be arranged at 45 degrees or 135 degrees from the x axis. In another example, fast axes of the waveplates 520 could be clocked at 90 degrees and transmission axes of reflective polarizers 524 could be clocked at 90 degrees.

Figure 7:
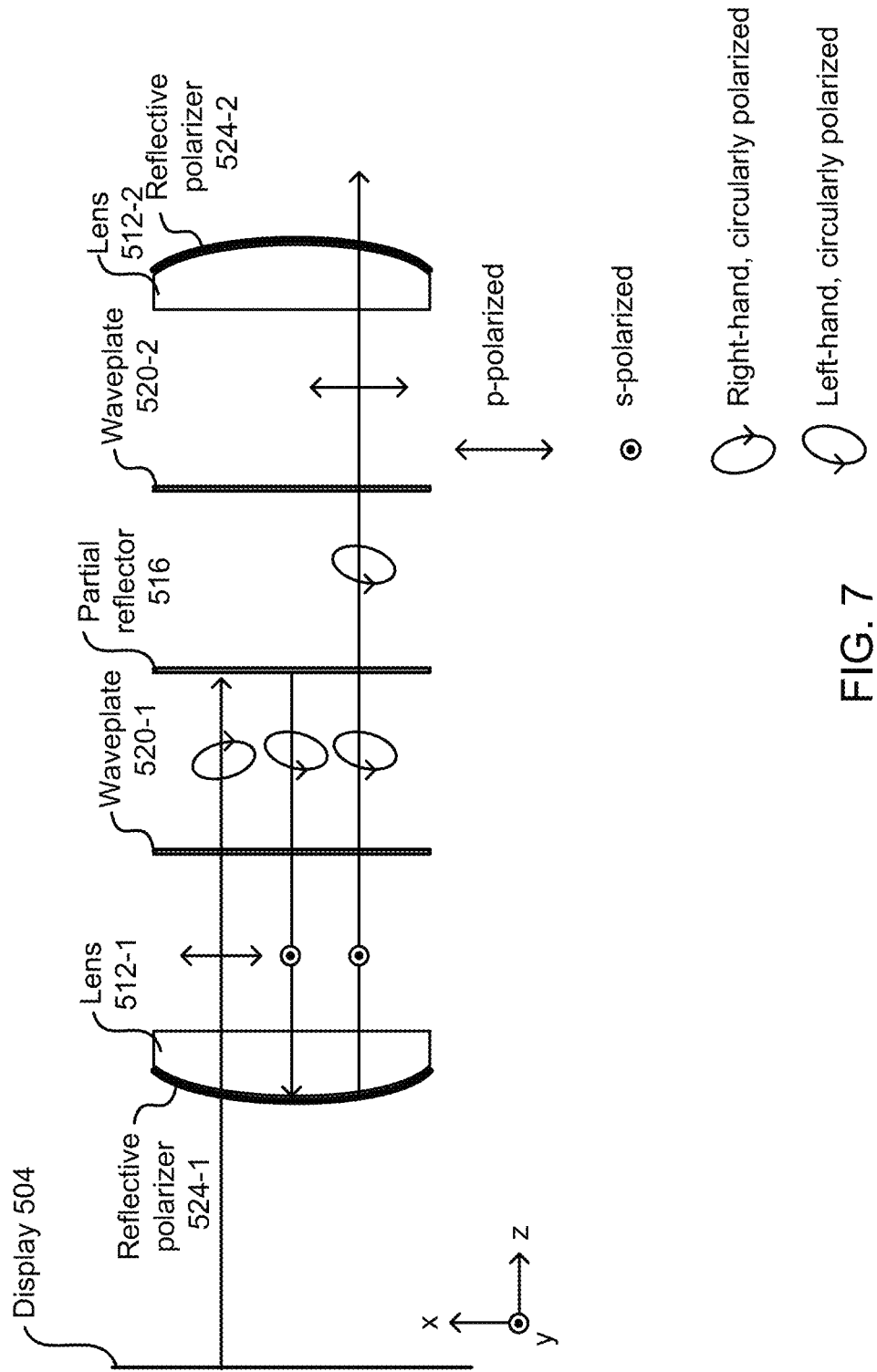
FIG. 7 depicts an embodiment of a second path of light in the lens system.

FIG. 7 depicts a second path of light in an embodiment of a lens system. Light from the display 504 passes through the first reflective polarizer 524-1, the first lens 512-1, the first waveplate 520-1, and reflected by the partial reflector 516. Light reflected by the partial reflector 516 is transmitted through the first waveplate 520-1, through the first lens 512-1, and reflected by the first reflective polarizer 524-1. Light reflected by the first reflective polarizer 524-1 is transmitted through the first lens 512-1, the first waveplate 520-1, the partial reflector 516 (e.g., with some loss), the second waveplate 520-2, the second lens 512-2, and the second reflective polarizer 524-2.

Figure 8:
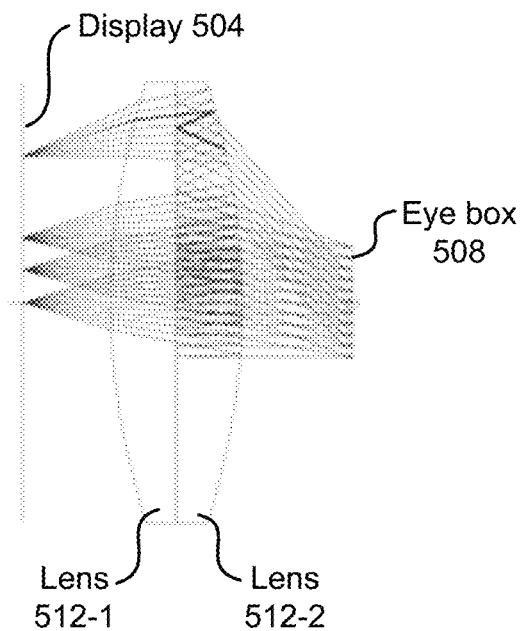
FIG. 8 is a ray tracing diagram of an embodiment of the first path of light in the lens system.

FIG. 8 is a ray tracing diagram of the first path (e.g., shown in FIG. 6) in an embodiment of a lens system. FIG. 8 depicts the display 504, the eye box 508, the first lens 512-1, and the second lens 512-2. The first lens 512-1 is bonded to the second lens 512-2 with the first waveplate, the partial reflector, and the second waveplate sandwiched between the first lens 512-1 and the second lens 512-2. The first waveplate is bonded to the first lens 512-1. The second waveplate is bonded to the second lens 512-2. The first waveplate and the second waveplate are bonded to the partial reflector. The first reflective polarizer is on the first lens 512-1 (e.g., on the curved surface of the first lens 512-1). The second reflective polarizer is on the second lens 512-2 (e.g., on the curved surface of the second lens 512-2).

Figure 9:
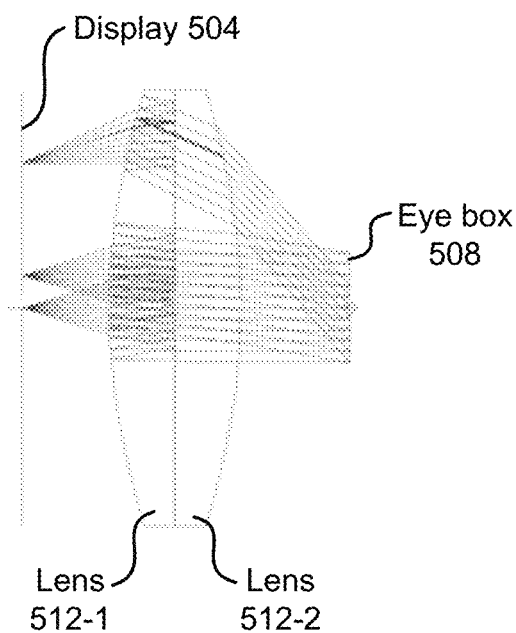
FIG. 9 is a ray tracing diagram of an embodiment of the second path of light in the lens system.

FIG. 9 is a ray tracing diagram of the second path (e.g., shown in FIG. 7) in an embodiment of the lens system. FIG. 9 depicts the display 504, the eye box 508, the first lens 512-1, and the second lens 512-2. The first lens 512-1 is bonded to the second lens 512-2 with the first waveplate, the partial reflector, and the second waveplate sandwiched between the first lens 512-1 and the second lens 512-2. The first waveplate is bonded to the first lens 512-1. The second waveplate is bonded to the second lens 512-2. The first waveplate and the second waveplate are bonded to the partial reflector. The first reflective polarizer is on the first lens 512-1 (e.g., on the curved surface of the first lens 512-1). The second reflective polarizer is on the second lens 512-2 (e.g., on the curved surface of the second lens 512-2).

Figure 10:
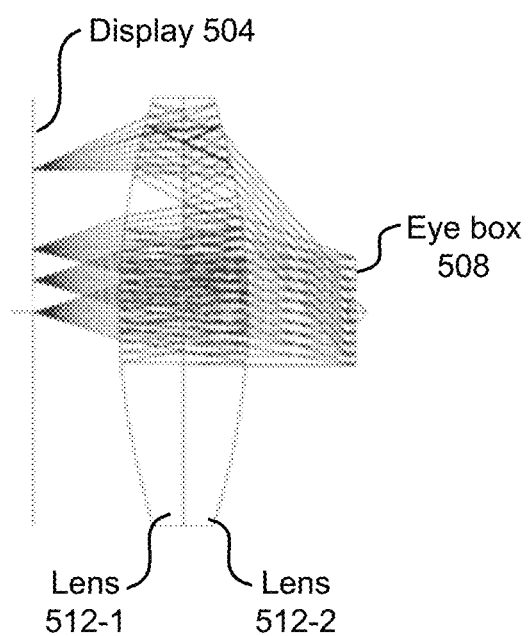
FIG. 10 is a ray tracing diagram of an embodiment of the first path of light and the second path of light in the lens system.

FIG. 10 is a ray tracing diagram of both the first path (e.g., shown in FIG. 8) and the second path (e.g., shown in FIG. 9) in an embodiment of the lens system. FIG. 10 depicts the display 504, the eye box 508, the first lens 512-1, and the second lens 512-2. The first lens 512-1 is bonded to the second lens 512-2 with the first waveplate, the partial reflector, and the second waveplate sandwiched between the first lens 512-1 and the second lens 512-2. The first waveplate is bonded to the first lens 512-1. The second waveplate is bonded to the second lens 512-2. The first waveplate and the second waveplate are bonded to the partial reflector. The first reflective polarizer is on the first lens 512-1 (e.g., on the curved surface of the first lens 512-1). The second reflective polarizer is on the second lens 512-2 (e.g., on the curved surface of the second lens 512-2).

Figure 11:
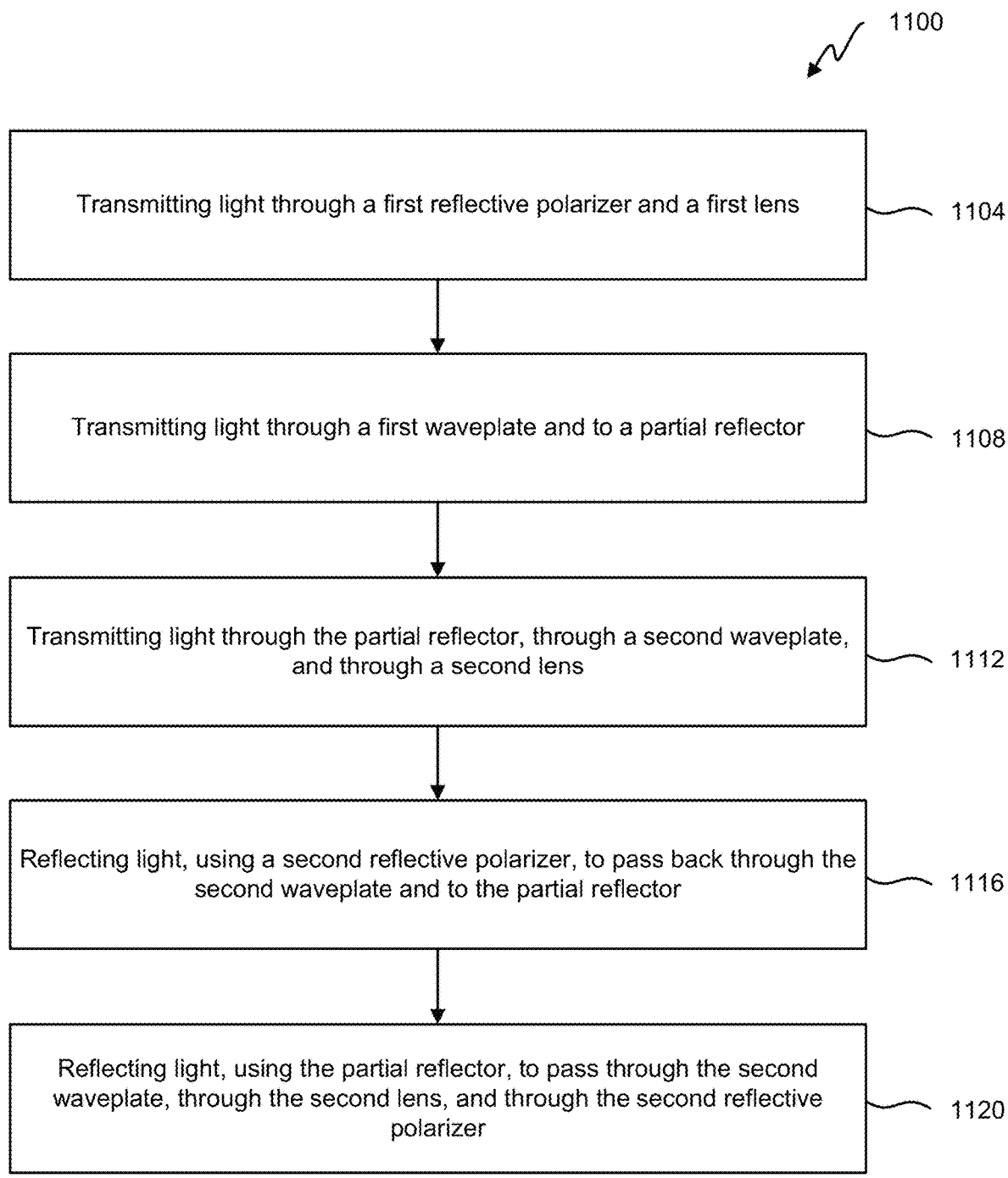
FIG. 11 depicts a flowchart of an embodiment of a process for using folded optics in a head-mounted display.

FIG. 11 depicts a flowchart of an embodiment of a process 1100 for using folded optics in a head-mounted display. Process 1100 begins with step 1104 with transmitting light from a display through a first reflective polarizer and a first lens. For example, light is transmitted from display 504 through the first reflective polarizer 524-1 and the first lens 512-1 in FIG. 6.

In step 1108, light from the first lens is transmitted transmitting light from the first lens through a first waveplate and to a partial reflector. For example, light from he first lens 512-1 is transmitted to the first waveplate 520-1 and to the partial reflector 516 in FIG. 6.

In step 1112, light is transmitted through the partial reflector, through a second waveplate, and through a second lens. For example, a portion of light (e.g., a first portion) is transmitted through the partial reflector 516, through the second waveplate 520-2 and through the second lens 512-2, as shown in FIG. 6.

In step 1116, light is reflected by a second reflective polarizer, back through the second waveplate, and to the partial reflector. For example, the portion of light transmitted through the partial reflector 516 (e.g., the first portion) is reflected by the second reflective polarizer 524-2 to pass through the second waveplate 520-2 and to the partial reflector 516 in FIG. 6 in a negative z direction.

In step 1120, the reflective polarizer reflects a portion of light to pass through the second waveplate (e.g., a third time), through the second lens, to the second reflective polarizer, and through the second reflective polarizer. The portion of light reflected by the reflective polarizer can be a second portion of light, the second portion being equal to the first portion minus what is transmitted (and/or absorbed) by the partial reflector. For example, the partial reflector 516 in FIG. 6 partially reflects right-hand, circularly polarized light to pass through the second waveplate 520-2 (a third time), through the second lens 512-2, and through the second reflective polarizer 524-2, as shown in FIG. 6.

FIG. 6 and FIG. 11 describe reflecting light by the second reflective polarizer to the partial reflector, and reflecting light from the partial reflector through the second lens and through the second reflective polarizer.

Figure 12:
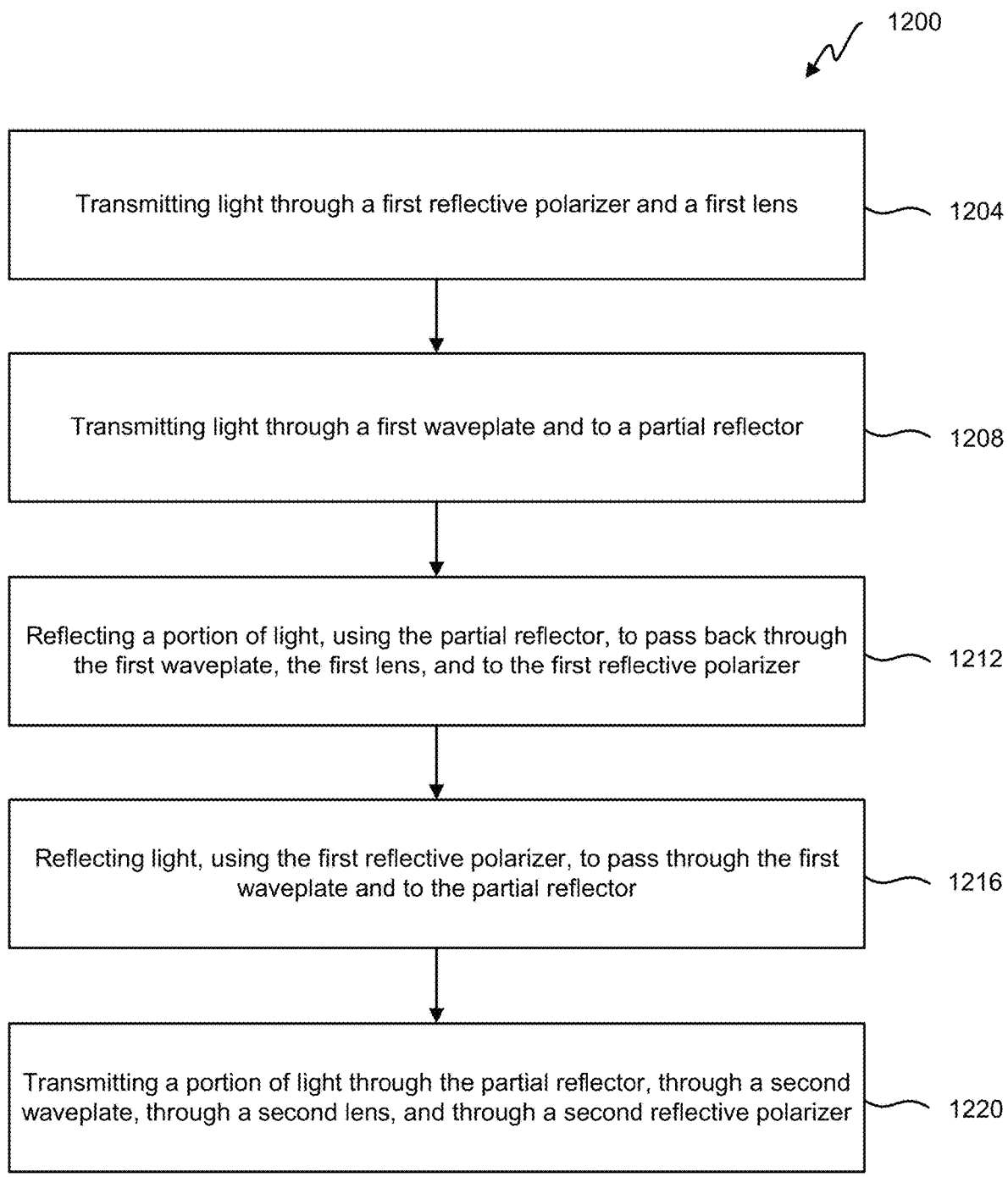
FIG. 12 depicts a flowchart of another embodiment of a process for using folded optics in a head-mounted display.

FIG. 12 depicts a flowchart of another embodiment of a process 1200 for using folded optics in a head-mounted display. Process 1200 begins with step 1204 with transmitting light from a display through a first reflective polarizer and a first lens. For example, light is transmitted from display 504 through the first reflective polarizer 524-1 and the first lens 512-1 in FIG. 7.

In step 1208, light from the first lens is transmitted transmitting light from the first lens through a first waveplate and to a partial reflector. For example, light from the first lens 512-1 is transmitted through the first waveplate 520-1 and to the partial reflector 516 in FIG. 7.

In step 1212, a portion of light is reflected by the partial reflector to pass back through the first waveplate, the first lens and to the first reflective polarizer. For example, light is reflected by the partial reflector 516 in FIG. 7 (e.g., a third portion, wherein the third portion is equal in magnitude to the first portion transmitted through the reflective polarizer in step 1112 of FIG. 11 for a 50/50 mirror) to pass through the first waveplate 520-1 and through the first lens 512-1 in the negative z direction.

In step 1216, light is reflected by the first reflective polarizer to pass through the first lens, the first waveplate and to the partial reflector. For example, s-polarized light is reflected by the first reflective polarizer 524-1 to pass through the first waveplate 520-1 in the positive z direction, and light passing through the first waveplate 520-1 is transmitted to the partial reflector 516, as shown in FIG. 7.

In step 1220, a portion of light (e.g., a fourth portion) is transmitted through the partial reflector, through a second waveplate, through a second lens, to a second reflective polarizer, and through the second reflective polarizer. For example, left-handed, circularly-polarized light passing through the partial reflector 516 in FIG. 7 is transmitted through the second waveplate 520-2, the second lens 512-2, to the second reflective polarizer, and through the second reflective polarizer 524-2.

FIG. 7 and FIG. 12 describe reflecting light from the partial reflector to the first reflective polarizer, and reflecting light by the first reflective polarizer, before transmitting light from the partial reflector through the second waveplate.

A person of skill in the art will recognize that the process 1100 in FIG. 11 can be performed concurrently with the process 1200 in FIG. 12.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain principles and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. An apparatus for folded optics in a head-mounted display, the apparatus comprising:
   a display of a virtual-reality device;
   a lens system arranged to focus light from the display to a user's eye of the virtual-reality device, the lens system comprising:
      a first lens, wherein:
         the first lens has a first surface and a second surface;
         the second surface is opposite the first surface;
         the first surface is curved;
         the first lens has a first thickness profile; and
         the first thickness profile is measured between the first surface and the second surface of the first lens; and
      a second lens, wherein:
         the second lens has a third surface and a fourth surface;
         the fourth surface is opposite the third surface;
         the fourth surface is curved;
         the second lens has a second thickness profile;
         the second thickness profile is measured between the third surface and the fourth surface;
         the second thickness profile is the same as the first thickness profile; and
         the second lens is symmetrically arranged in relation to the first lens so that the third surface is closer to the second surface than the first surface, and the second surface is closer to the third surface than the fourth surface;
      a partial reflector between the first lens and the second lens;
      a first waveplate between the partial reflector and the first lens, wherein:
         the first waveplate is a quarter waveplate; and
         the first waveplate is adhered to the second surface of the first lens;
      a second waveplate between the partial reflector and the second lens, wherein:
         the second waveplate is a quarter waveplate; and
         the second waveplate has a fast axis parallel to a fast axis of the first waveplate so that the fast axis of the second waveplate is oriented in a similar direction as the fast axis of the first waveplate;
      a first reflective polarizer on the first surface of the first surface and arranged so that the first lens is between the first waveplate and the first reflective polarizer; and
      a second reflective polarizer on the fourth surface of the second lens and arranged so that the second lens is between the second waveplate and the second reflective polarizer.

2. The apparatus of claim 1, wherein:
   the second surface of the first lens and the third surface of the second lens are flat; and
   the first thickness profile corresponds to a plano-convex lens.

3. An apparatus for folded optics in a head-mounted display, the apparatus comprising:
   a display;
   a lens system arranged to focus light from the display to a user's eye, the lens system comprising:
      a first lens, wherein:
         the first lens has a first surface and a second surface;
         the second surface is opposite the first surface;
         the first surface is curved;
         the first lens has a first thickness profile; and
         the first thickness profile is measured between the first surface and the second surface of the first lens; and
      a second lens, wherein:
         the second lens has a third surface and a fourth surface;
         the fourth surface is opposite the third surface;
         the fourth surface is curved;
         the second lens has a second thickness profile;
         the second thickness profile is measured between the third surface and the fourth surface;

the second thickness profile is the same as the first thickness profile; and the second lens is symmetrically arranged in relation to the first lens so that the third surface is closer to the second surface than the first surface, and the second surface is closer to the third surface than the fourth surface;

a partial reflector between the first lens and the second lens;

a first waveplate between the partial reflector and the first lens;

a second waveplate between the partial reflector and the second lens;

a first reflective polarizer, arranged so that the first lens is between the first waveplate and the first reflective polarizer; and a second reflective polarizer, arranged so that the second lens is between the second waveplate and the second reflective polarizer.

4. The apparatus of claim 3, wherein the first thickness profile corresponds to a plano-convex lens.

5. The apparatus of claim 3, wherein:
the first reflective polarizer is on the first surface; and
the second reflective polarizer is on the fourth surface.

6. The apparatus of claim 3, wherein the first waveplate and the second waveplate are quarter-wave plates.

7. The apparatus of claim 3, wherein a fast axis of the first waveplate and a fast axis of the second waveplate are oriented in similar directions.

8. The apparatus of claim 3, wherein the second surface of the first lens and the third surface of the second lens are flat.

9. The apparatus of claim 3, wherein:
the first waveplate is bonded to the first lens;
the second waveplate is bonded to the second lens;
the first waveplate is bonded to the partial reflector; and
the second waveplate is bonded with the partial reflector.

10. The apparatus of claim 3, wherein the first waveplate, the second waveplate, and the partial reflector are flat.

11. The apparatus of claim 3, wherein the apparatus is part of a virtual-reality headset.

12. A method for using folded optics in a head-mounted display comprising:
transmitting light from a display through a first reflective polarizer and a first 2 lens, wherein:
the first lens has a first surface and a second surface;
the second surface is opposite the first surface;
the first surface is curved;
the first lens has a first thickness profile; and
the first thickness profile is measured between the first surface and the second surface of the first lens;
transmitting light from the first lens through a first waveplate and to a partial reflector, wherein:
the first waveplate is between the partial reflector and the first lens; and the first lens is between the first waveplate and the first reflective polarizer;

transmitting light from the partial reflector through a second waveplate and to a second lens, wherein:
the partial reflector is between the first lens and the second lens;
the second waveplate is between the partial reflector and the second lens;
the second lens has a third surface and a fourth surface;
the fourth surface is opposite the third surface;
the fourth surface is curved;
the second lens has a second thickness profile;
the second thickness profile is measured between the third surface and the fourth surface;
the second thickness profile is the same as the first thickness profile; and
the second lens is symmetrically arranged in relation to the first lens so that the third surface is closer to the second surface than the first surface, and the second surface is closer to the third surface than the fourth surface; and transmitting light through the second lens and to a second reflective polarizer, wherein the second lens is between the second waveplate and the second reflective polarizer.

13. The method of claim 12, wherein the first thickness profile corresponds to a plano-convex lens.

14. The method of claim 12, wherein:
the first reflective polarizer is on the first surface; and
the second reflective polarizer is on the fourth surface.

15. The method of claim 12, wherein the first waveplate and the second waveplate are quarter-wave plates.

16. The method of claim 12, wherein a fast axis of the first waveplate and a fast axis of the second waveplate are oriented in similar directions.

17. The method of claim 12, wherein the second surface of the first lens and the third surface of the second lens are flat.

18. The method of claim 12, wherein:
the first waveplate is bonded to the first lens;
the second waveplate is bonded to the second lens;
the first waveplate is bonded to the partial reflector; and
the second waveplate is bonded with the partial reflector.

19. The method of claim 12, further comprising reflecting light from the partial reflector to the first reflective polarizer, and reflecting light using the first reflective polarizer, before transmitting light from the partial reflector through the second waveplate.

20. The method of claim 12, further comprising:
reflecting light using the second reflective polarizer to the partial reflector, and
reflecting light from the partial reflector through the second lens and through the second reflective polarizer.

* * * * *